(12) United States Patent
He (10) Patent No.: US 9,699,461 B2
(45) Date of Patent: Jul. 4, 2017

(54) SCALING IN PERCEPTUAL IMAGE AND VIDEO CODING

(71) Applicant: BlackBerry Limited, Waterloo (CA)

(72) Inventor: Dake He, Waterloo (CA)

(73) Assignee: BlackBerry Limited, Waterloo (CA)

( * ) Notice: Subject to any disclaimer, the term of this patent is extended or adjusted under 35 U.S.C. 154(b) by 228 days.

(21) Appl. No.: 14/826,265

(22) Filed: Aug. 14, 2015

(65) Prior Publication Data

US 2017/0048526 A1 Feb. 16, 2017

(51) Int. Cl.
*H04N 19/13* (2014.01)
*H04N 19/187* (2014.01)
*H04N 19/126* (2014.01)
*H04N 19/94* (2014.01)

(52) U.S. Cl.
CPC .......... *H04N 19/13* (2014.11); *H04N 19/126* (2014.11); *H04N 19/187* (2014.11); *H04N 19/94* (2014.11)

(58) Field of Classification Search
None
See application file for complete search history.

(56) References Cited

U.S. PATENT DOCUMENTS

| | | | | |
|---|---|---|---|---|
| 5,946,417 A * | 8/1999 | Bonneau | ............ | G06K 9/00221 375/240.02 |
| 7,302,004 B2 * | 11/2007 | Zhang | ................ | G06K 9/00711 348/E5.065 |
| 8,326,067 B2 | 12/2012 | Furbeck | | |
| 8,532,417 B2 | 9/2013 | Furbeck | | |
| 9,319,645 B2 * | 4/2016 | Fukui | ..................... | H04N 19/94 |
| 2003/0086496 A1 * | 5/2003 | Zhang | ................ | G06K 9/00711 375/240.16 |
| 2008/0310504 A1 * | 12/2008 | Ye | ......................... | H04N 19/197 375/240.02 |
| 2009/0268810 A1 * | 10/2009 | Dai | .......................... | G06T 9/20 375/240.12 |
| 2011/0135212 A1 * | 6/2011 | Alshina | ................ | H04N 19/176 382/250 |
| 2013/0022115 A1 * | 1/2013 | Oh | ........................ | H04N 19/122 375/240.12 |
| 2014/0286399 A1 * | 9/2014 | Valin | ...................... | H04N 19/94 375/240.03 |

(Continued)

OTHER PUBLICATIONS

G. Bjontegaard, "Calculation of average PSNR differences between RD-curves," VCEG-M33, 13th VCEG Meeting, Austin, TX, USA, Apr. 2001.

(Continued)

*Primary Examiner* — Frederick Bailey
(74) *Attorney, Agent, or Firm* — Rowand LLP (57) ABSTRACT

Methods and devices for image and video coding. A block of N coefficients is defined as an input vector of N dimensions having a magnitude value and N−1 angle values. The encoder normalizes and quantizes the angle values to produce quantized angle values, reconstructs the angle values from the quantized angle values and determines a quantizer based on the reconstructed angle values. The determined quantizer is then used to quantize the magnitude value. The quantized angle values and the quantized magnitude value are entropy encoded. The decoder preforms the reverse process, and determines the quantizer for inverse quantizing the quantized magnitude value from the reconstructed angle values.

23 Claims, 6 Drawing Sheets

(56) References Cited

U.S. PATENT DOCUMENTS

2015/0256832 A1* 9/2015 Pearson .............. H04N 19/124
375/240.03

OTHER PUBLICATIONS

Z. Wang, A. C. Bovik, H. R. Sheikh, and E. P. Simoncelli, "Image quality assessment: From error visibility to structural similarity," IEEE Trans. Image Proc., vol. 13, pp. 600-612, Apr. 2004.

D.-K. He and J. Wang, "On rate distortion optimized quantization based on weighted mean squared error for lossy image coding," in Proc. ICIP 2014.

S. Wang, A. Rehman, Z. Wang, S. Ma, and W. Gao, "SSIM-Motivated Rate-Distortion Optimization for Video Coding," IEEE Trans. Circuit and Systems for Video Technology, vol. 22, 2012.

C. Yeo, H. L. Tan, and Y. H. Tan, "On Rate Distortion Optimization Using SSIM" IEEE Trans. Circuit and Systems for Video Technology, vol. 23, 2013.

J.-M. Valin, "Perceptual vector quantization for video coding," to be presented at the SPIE Visual Information Processing and Communication Conference, 2015.

T. R. Fischer, "A pyramid vector quantizer," IEEE Trans. Inform. Theory, vol. 32, pp. 568-583, 1986.

S. Wang, A. Rehman, Z. Wang, S. Ma, and W. Gao, "Perceptual video coding based on SSIM-inspired divisive normalization," IEEE Trans. Image Processing, vol. 22, pp. 1418-1429, 2013.

U.S. Appl. No. 14/552,590, filed Nov. 25, 2014.

EPO, Extended European Search Report relating to application No. 16183623.4, dated Oct. 10, 2016.

Valin et al.: "Perceptual vector quantization for video coding" Optomechatronic micro/nano devices and components III: Oct. 8-10, 2007, Lausanne, Switzerland, vol. 9410, Mar. 4, 2015, XP0600046496.

Yu et al.: "Improved quantization for HEVC", 2. JCT-VC Meeting; Jul. 21, 2010-Jul. 28, 2010; Geneva; (Joint Collaborativeteam on Video Coding of ISO/IEC JTC1/SC29/WG11 and ITU-T SG. 16); No. JCTVC-B035, Jul. 25, 2010, XP030007615.

Bovik et al.: "Image Quality Assessment: From Error Visibility to Structural Similarity", IEEE Transactions on Image Processing, IEEE Service Center, Apr. 1, 2004, XP011110418.

* cited by examiner

SCALING IN PERCEPTUAL IMAGE AND VIDEO CODING

FIELD

The present application generally relates to data compression and, in particular, to methods and devices for perceptual image and video coding.

BACKGROUND

Data compression is used in communications and computer networking to store, transmit, and reproduce information efficiently. It finds particular application in the encoding of images, audio and video. Common image compression formats include JPEG, TIFF, and PNG. An image compression standard proposed by Google™ is WebP. A popular video coding standard has been the ITU-T H.264/AVC video coding standard. It defines a number of different profiles for different applications, including the Main profile, Baseline profile and others. A newly-developed video coding standard is the ITU-T H.265/HEVC standard. Other standards include VP-8, VP-9, AVS, and AVS-2.

All of these image and video coding standards operate by partitioning and image/picture into blocks (in some cases, a hierarchy of blocks and subblocks, like the coding tree blocks (CTB) of HEVC). A block is predicted and the difference (residual) between the prediction and the actual pixel data of the block is then transformed, quantized and entropy encoded. The quantization of transform domain coefficients introduces distortion that reduces the reconstructed picture quality at the decoder. Many of these processes use some type of rate-distortion optimization routine to select coding parameters based upon trade-offs between transmission rate and distortion.

The human visual system does not have the same sensitivity to all distortion. For example, humans are more sensitive to distortion in lower frequency components than to distortion in higher frequency components. The measure of distortion most commonly used is peak signal-to-noise ratio (PSNR), which measures the mean squared error (MSE) between spatial domain pixels in the reconstructed picture versus the original picture. However, this is not necessarily an accurate representation of human sensitivity to distortion.

Work on human perception of image and video distortion has led to the development of various measurements of "structural similarity" (SSIM) between an original picture and its reconstruction, which may be a better representation of human perception of error than PSNR. A structural similarity metric may take into account the mean values of the two pictures (or a window or block of pixels), the variance within each of those pictures/blocks and the covariance of those two pictures/blocks. SSIM may, therefore, be useful in making coding decisions. However, actual structural similarity metrics are complex to calculate. In U.S. patent application Ser. No. 14/552,590, filed Nov. 25, 2014, a distortion metric entitled weighted mean square error (WMSE) was described for perceptual image and video coding. The contents of U.S. patent application Ser. No. 14/552,590 are hereby incorporated by reference.

The subjective quality of coded images or video may still be improved.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present application describes methods and encoders/decoders for encoding and decoding images and/or video.

In a first aspect, the present application describes a method of encoding an image to create a bitstream of encoded data using an encoder, the image being partitioned into blocks. The method includes, for a current block containing a sequence of N coefficients, defining the sequence as an input vector of N dimensions, the input vector having a magnitude value. It further includes normalizing the input vector using the magnitude value of the input vector to generate a normalized vector, the normalized vector having angle values; quantizing the normalized vector to produce a quantized normalized vector; reconstructing the angle values from the quantized normalized vector; determining a quantizer based on the reconstructed angle values; quantizing the magnitude value using the quantizer; and entropy encoding the quantized normalized vector and the quantized magnitude value.

In another aspect, the present application discloses a method of decoding a bitstream of encoded data using a decoder to create a reconstructed image corresponding to an image, the image being partitioned into blocks. The method includes, for a current block containing a sequence of N coefficients, wherein the sequence is defined as an input vector of N dimensions, decoding the encoded data to obtain a quantized normalized vector and a quantized magnitude value; inverse quantizing the quantized normalized vector to obtain reconstructed angle values; determining a magnitude reconstructor based on the reconstructed angle values; and generating a reconstructed magnitude value from the quantized magnitude value using the magnitude reconstructor, A reconstructed vector defined by the reconstructed angle values and the reconstructed magnitude value comprises a reconstructed sequence of the N coefficients.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

It will be understood that some aspects of the present application are not limited to either image or video coding and may be applied to image and video coding in some embodiments.

In the description that follows, some example embodiments are described with reference to the H.264/AVC standard for video coding and/or the H.265/HEVC standard. Those ordinarily skilled in the art will understand that the present application is not limited to H.264/AVC or H.265/HEVC but may be applicable to other video coding/decoding standards, including possible future standards, multi-view coding standards, scalable video coding standards, 3D video coding standards, and reconfigurable video coding standards. Similarly, to the extent that reference is made to particular image coding standards, like JPEG or WebP, it will be appreciated that the processes and devices described may be implemented in connection with other standards, including future standards In the description that follows, when referring to video or images the terms frame, picture, slice, tile, quantization group, and rectangular slice group may be used somewhat interchangeably. Those of skill in the art will appreciate that a picture or frame may contain one or more slices or segments. A series of frames/pictures may be called a "sequence" in some cases. Other terms may be used in other video or image coding standards. It will also be appreciated that certain encoding/decoding operations might be performed on a frame-by-frame basis, some are performed on a slice-by-slice basis, some picture-by-picture, some tile-by-tile, and some by rectangular slice group, etc., depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, etc., as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, quantization groups, etc., as will become apparent in light of the description below.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
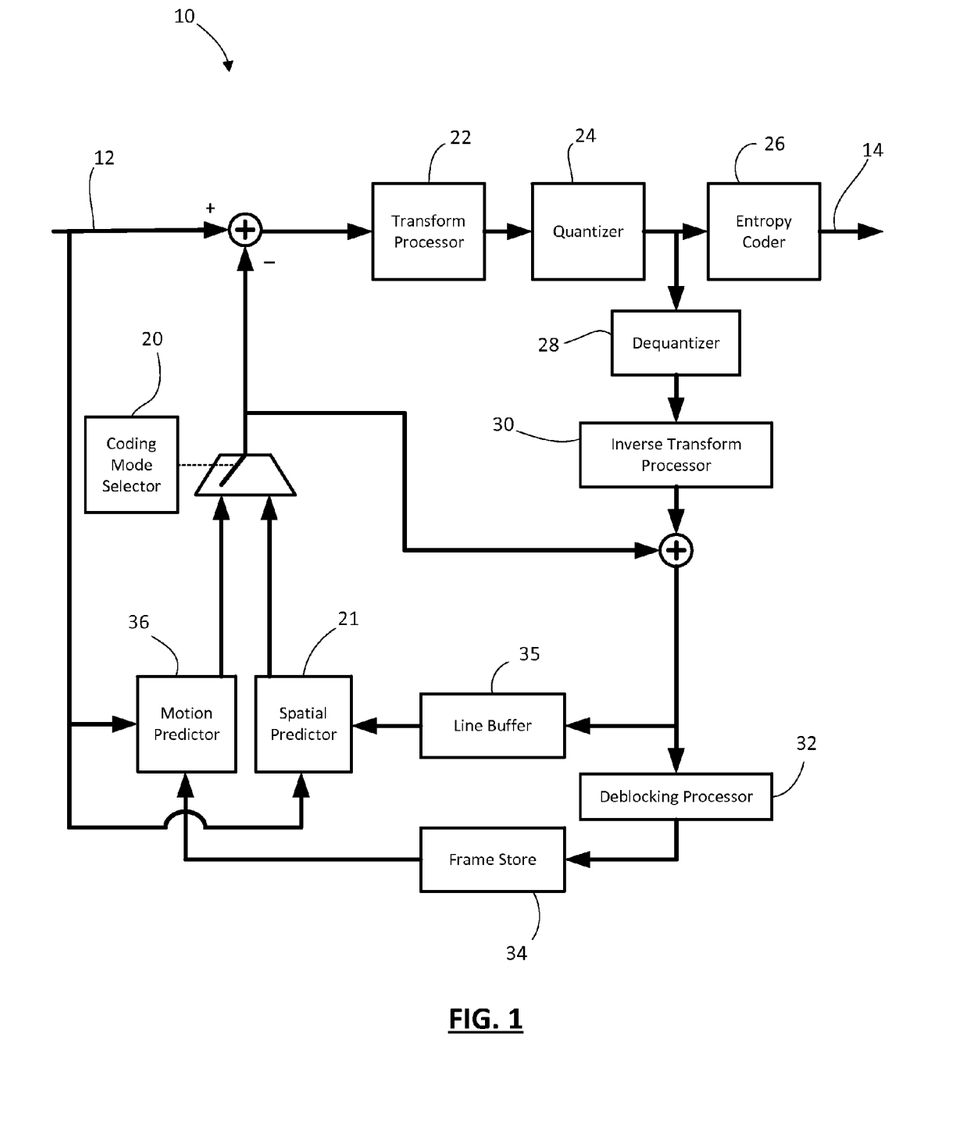
FIG. 1 shows, in block diagram form, an encoder for encoding video.
Figure 2:
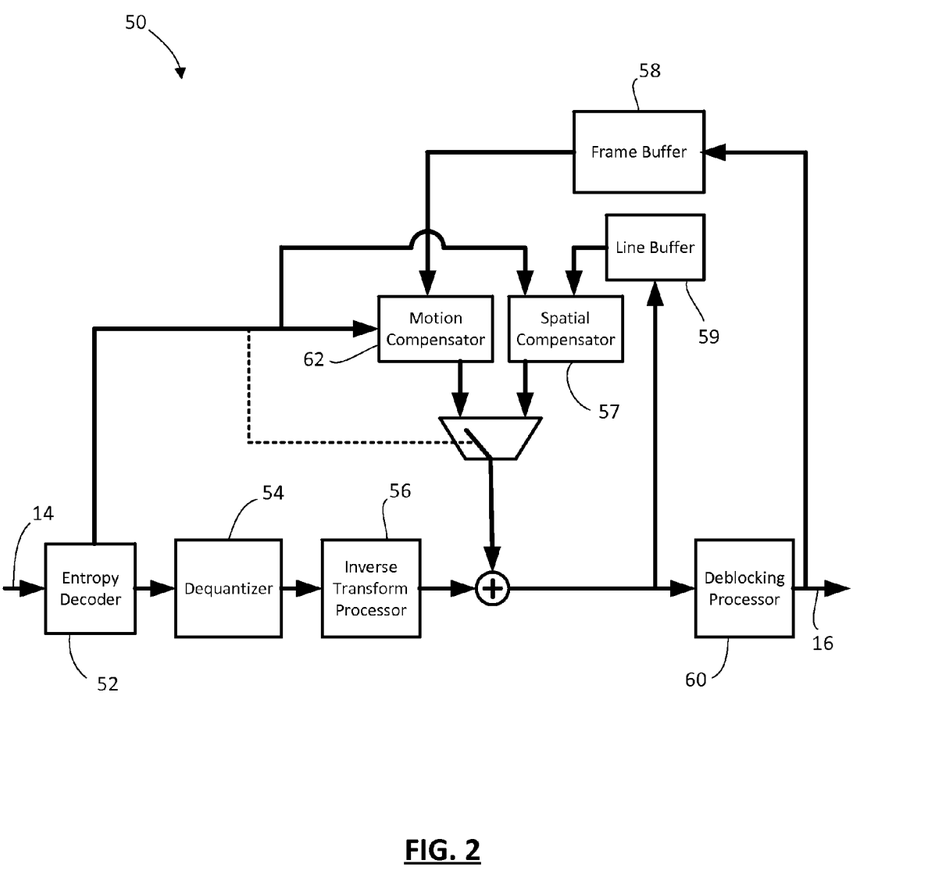
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform, a wavelet transform, or others may be used in some instances. The block-based transform is performed on a transform unit. The transform unit may be the size of the coding unit, or the coding unit may be divided into multiple transform units. In some cases, the transform unit may be non-square, e.g. a non-square quadrature transform (NSQT).

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. Transform domain coefficients are typically processed in a scan order (which may sometimes be termed a reverse scan order), meaning the coefficients of the block are in a "sequence". As will become clear from the description below, the sequence of coefficients may be considered a vector in an N-dimensional space, where there are N coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction operation, the encoder creates a predicted block or unit based on the data of nearby pixels. There are various modes or directions for prediction. In some cases rate-distortion optimization may be used to select a mode/direction. The nearby pixels used in the prediction operation are reconstructed pixels that have been previously encoded and decoded and stored in a line buffer 35 within the feedback loop. The difference between the actual pixel data for the block and the predicted block is a residual block, i.e. an error signal. The residual data is transformed, quantized and encoded for transmission in the bitstream 14.

Inter-coded frames/blocks rely upon temporal prediction, i.e. they are predicted using reconstructed data from other frames/pictures. The encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. In other words, a motion vector search is carried out to identify a block within another frame/picture. That block is the source of the predicted block or unit. The difference between the predicted block and the original block becomes the residual data that is then transformed, quantized and encoded.

Those ordinarily skilled in the art will appreciate the details and possible variations for implementing video encoders.

The decoder 50 includes an entropy decoder 52, dequantizer 54, inverse transform processor 56, and deblocking processor 60. The deblocking processor 60 may include deblocking and filtering processors. A line buffer 59 stores reconstructed pixel data while a frame/picture is being decoded for use by a spatial compensator 57 in intra-coding. A frame buffer 58 stores fully-reconstructed and deblocked frames for use by a motion compensator 62 in applying motion compensation.

The bitstream 14 is received and decoded by the entropy decoder 52 to recover the quantized coefficients. Side information may also be recovered during the entropy decoding process, including coding mode information, some of which may be supplied to the feedback loop for use in creating the predictions. For example, the entropy decoder 52 may recover motion vectors and/or reference frame information for inter-coded blocks, or intra-coding mode direction information for the intra-coded blocks.

The quantized coefficients are then dequantized by the dequantizer 54 to produce the transform domain coefficients, which are then subjected to an inverse transform by the inverse transform processor 56 to recreate/reconstruct the residual pixel-domain data. The spatial compensator 57 generates the video data from the residual data and a predicted block that it creates using spatial prediction. The spatial prediction applies the same prediction mode/direction as was used by the encoder in reliance upon previously-reconstructed pixel data from the same frame. Inter-coded blocks are reconstructed by creating the predicted block based on a previously-decoded frame/picture and the motion vector decoded from the bitstream. The reconstructed residual data is then added to the predicted block to generate the reconstructed pixel data. Both spatial and motion compensation may be referred to herein as "prediction operations".

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

In many cases, distortion is measured by comparing the original pixels to the reconstructed pixels. For example, distortion may be measured using peak signal-to-noise ratio (PSNR), which is based on the mean-squared error between the original and reconstructed pixels. While PSNR is straightforward to calculate, it does not accurately model the human visual system's perception of quality. Alternative measurements of distortion that more closely model human visual perception have been developed, such as structural similarity (SSIM) measurements. In the spatial domain, the SSIM between an image x and its reconstruction y may be given by:

$$SSIM(x, y) = \left(1 - \frac{(\mu_x - \mu_y)^2}{(\mu_x^2 + \mu_y^2 + C_1)}\right)\left(1 - \frac{\|(x - \mu_x) - (y - \mu_y)\|^2}{\|x - \mu_x\|^2 + \|y - \mu_y\|^2 + (n-1)C_2}\right)$$

In this expression, $\mu_x$ is the mean of x, $\mu_y$ is the mean of y, $\|\cdot\|$ denotes the L2 norm, and $C_1$ and $C_2$ are constants that are used to avoid instability when the denominators are close to zero. For brevity, we use (v−a), where $v=(v_0, v_1, \ldots, v_{k-1})$ is a length-k vector, k>1, and a is a scalar, so as to denote the vector $(v_0-a, v_1-a, \ldots, v_{k-1}-a)$. Notably, the SSIM function takes vectors as inputs and cannot be factored into simple functions with scalar inputs, which implies that dynamic programming might not be possible in solving problems based on SSIM in a cost function, i.e. for making coding decisions in an image or video encoder or decoder.

In order to address the computational complexity associated with using the above expression for SSIM in practical image/video coding, but to still incorporate statistical measurements that reflect perceptual quality, one can modify the traditional mean squared error (MSE) measurement to create a weighted mean squared error (WMSE) measurement. For example, one expression of WMSE proposes a two-tuple metric ($w_{dc}$, $w_{ac}$) that measures the WMSE for the DC coefficients and the AC coefficients separately. Example expressions are:

$$w_{dc}(x, y) = \frac{(\mu_x - \mu_y)^2}{2\mu_x^2 + C_1}$$

$$w_{ac}(x, y) = \frac{\|(x - \mu_x) - (y - \mu_y)\|^2}{2\|x - \mu_x\|^2 + (n-1)C_2}$$

In these examples for measuring or quantifying perceptual distortion, the vector x is a sequence of pixel-related values (in the pixel domain or transform domain). For example, x may be a sequence of coefficients from a block of pixels within an image or video. An example 4×4 block may result in a sequence of 16 transform domain coefficients. In a Cartesian coordinate system extended to an N-dimensional Euclidean space, the sequence of N transform domain coefficients can be understood as defining a point in that N-dimensional space, with the coefficients each defining the projection of that point onto the respective associated axis for that coordinate's dimension. A polar coordinate system may alternatively be used to represent such a vector in an N-dimensional space. In such a space, the sequence of transform domain coefficients may be understood as an N-dimensional vector that can be defined or understood as a magnitude and N−1 free angles.

To extend the polar coordinate system to N-dimensions, let $e_k$ denote the unit vector that points to the direction of the k-th axis, where k=1, . . . ,N. Let $e_k=(e_{k,0}, \ldots, e_{k,N-1})$. Then $$e_{k,i} = \begin{cases} 1 & i = k-1 \\ 0 & \text{otherwise} \end{cases}.$$

In the extended Polar coordinate system, a point $x=(x_0, \ldots x_{N-1})$ where $x_i$ denotes the (i+1)-th coordinate of x, is represented by a radius r and a vector $\theta=(\theta_0, \ldots, \theta_{N-1})$ such that $$r = \|x\|_2, \text{ and}$$

$$\cos\theta_i = \begin{cases} \frac{\langle x, e_i \rangle}{\|x\|_2} = \frac{x_i}{r} & \text{if } r > 0 \\ 0 & \text{if } r = 0 \end{cases}$$

where $\langle x,y \rangle$ denotes the inner product of x and y, and $\|x\|_2 = \sqrt{\langle x,x \rangle} = \sqrt{\Sigma_{i=0}^{N-1} x_i^2}$ denotes the L2 norm of x. Note that $\Sigma_{i=0}^{N-1} \cos^2 \theta_i = 1$ and thus $\theta$ has only N−1 degrees of freedom.

The above discussion regarding SSIM and WMSE may now be revisited from the perspective of the polar coordinate system. Without losing generality, the following description uses the example of computation of SSIM and WMSE in the DCT domain. Note that since DCT is orthonormal, it follows from their respective definitions that for any x and y, SSIM(x,y)=SSIM(DCT(x),DCT(y)), and WMSE(x,y)=WMSE(DCT(x),DCT(y)).

Suppose now that $x=(x_0, \ldots x_{N-1})$ is a vector in the DCT domain, where $x_0$ is the DC coefficient, and $x_1, \ldots x_{N-1}$ are the AC coefficients. Let $y=(y_0, \ldots y_{N-1})$ denote a distorted version of x. Then $$SSIM(x, y) = \left(\frac{2x_0 y_0 + NC_1}{x_0^2 + y_0^2 + NC_1}\right) \left(\frac{2\sum_{i=1}^{N-1} x_i y_i + (N-1)C_2}{\sum_{i=1}^{N-1} x_i^2 + \sum_{i=1}^{N-1} y_i^2 + (N-1)C_2}\right).$$

Regard $(x_1, \ldots x_{N-1})$ and $(y_1, \ldots y_{N-1})$ as two vectors in (N−1)-dimensional space. The radius-angle pair $(r_x, \theta_x)$ of $(x_1, \ldots x_{N-1})$ in the Polar coordinate system may be determined, where $\theta_x = (\theta_{x,1}, \ldots \theta_{x,N-1})$. Note that $\theta_x$ here has N−2 degrees of freedom. Similarly, $(r_y, \theta_y)$ of $(y_1, \ldots y_{N-1})$ may be determined, where $\theta_y = (\theta_{y,1}, \ldots \theta_{y,N-1})$. Denote $\alpha_x = (\cos\theta_{x,1}, \ldots \cos\theta_{x,N-1})$ and $\alpha_y = (\cos\theta_{y,1}, \ldots \cos\theta_{y,N-1})$. It is easy to see that $\alpha_x$ is the normalized $(x_1, \ldots x_{N-1})$, and $\alpha_y$ is the normalized $(y_1, \ldots y_{N-1})$. SSIM may then be expressed as:

$$SSIM(x, y) = \left(\frac{2x_0 y_0 + NC_1}{x_0^2 + y_0^2 + NC_1}\right) \left(\frac{2r_x r_y \langle \alpha_x, \alpha_y \rangle + (N-1)C_2}{r_x^2 + r_y^2 + (N-1)C_2}\right)$$

Similarly, WMSE may be expressed as:

$$w_{ac}(x, y) = \frac{\|r_x \alpha_x - r_y \alpha_y\|_2^2}{2r_x^2 + (N-1)C_2}$$

In view of the above two equations, it will be understood that, in order to maintain SSIM or WMSE, it may be advantageous to quantize $r_x$ and $\theta_x$ (or equivalently $\alpha_x$) separately. Note that $r_x$ relates to the overall energy level of $(x_1, \ldots x_{N-1})$, and $\theta_x$ (or equivalently $\alpha_x$) relates to the internal structure (or direction) of $(x_1, \ldots x_{N-1})$.

Insights drawn from the above-expression of WMSE and/or SSIM help to develop a quantization process and system for quantization from the point-of-view of perceptual distortion. In particular, in one aspect, the present application provides a quantizer design that first quantizes the normalized local composition (i.e. angle) of an image block, and then quantizes the overall energy level of the image block conditioned upon the reconstructed normalized local composition. Correspondingly, on the decoder side, the normalized local composition is first reconstructed, and then the overall energy level is constructed. In some embodiments, the reconstructed normalized local composition data is used to select a quantizer for the overall energy level. In yet other embodiments, the reconstructed normalized local composition data is used to refine a prediction used in coding the overall energy level.

Quantization without Prediction

In a first example, the quantization does not use prediction. That is, the input source vector x is directly quantized without a prediction operation, where $x=x_0 \ldots x_{N-1}$ denotes a length-N source vector to be quantized, and where N is a positive integer known to both the encoder and decoder. N may be 16, for example, in a case where the source vector relates to a set of coefficients or pixels from a 4×4 block. In another example, N may be 15 or 63, and the source vector relates to a set of AC coefficients from a 4×4 or 8×8 block, respectively.

In this example, $r_x$ denotes the radius of the vector x, i.e., $r_x = \|x\|_2$, and $\alpha_x = \alpha_{x,0} \ldots \alpha_{x,N-1}$ denotes the normalized source vector, i.e., $$\alpha_{x,i} = \frac{x_i}{\|x\|_2}, i = 0, \ldots, N-1,$$

and $\|\alpha_x\|_2 = 1$. In implementations where integer arithmetic is preferred, $\|\alpha_x\|_2$ may be constrained to a constant integer K, and thus $$\alpha_{x,i} = \frac{x_i}{\|x\|_2} \sqrt{K}.$$

When $\|\alpha_x\|_2 = 1$, we might sometimes be interested in the angle vector $\theta_x = \theta_{x,0} \ldots \theta_{x,N-1}$ of x, i.e., $\theta_{x,i} = \cos^{-1} \alpha_{x,i}$. From this perspective, the vector $\alpha_x$ might be sometimes referred to as the angle vector or the composition vector.

As noted above, WMSE may be expressed as:

$$w_{ac}(x, y) = \frac{\|r_x \alpha_x - r_y \alpha_y\|_2^2}{2r_x^2 + (N-1)C_2}$$

For a sufficiently large $r_x^2$, this may be approximated as:

$$\frac{\|\alpha_x - \alpha_y\|_2^2}{2}$$

From this approximation, it will be noted that the distortion (measured in WMSE or SSIM) resulting from quantization of $\alpha_x$ may be effectively computed on its own without knowing the radius $r_x$ or information from other blocks/vectors. This understanding justifies quantizing $\alpha_x$ before quantizing $r_x$.

Due to the constraint that $\|\alpha_x\|_2=1$, the quantizer is naturally a vector quantizer. In one embodiment, the quantizer may be designed based upon a codebook $\{b\}$ for y that satisfies the following constraint:

$$b \in \mathbb{Z}^N: \sum_{i=0}^{N-1} |b_i| = K$$

where K is a constant. K may be computed from the quantized $\|x\|_2$: the larger the norm $\|x\|_2$ is, the larger the number K is. This may sometimes be referred to as gain-shape quantization.

In another embodiment, it may be advantageous to use a lattice structure to quantize $\alpha_x$ while still enforcing the constraint on the norm. A trellis search algorithm may be used to reduce computational complexity in the quantization process in the encoder.

In one example embodiment, the following quantization process may be used. In this example, $\alpha = \alpha_0 \ldots \alpha_{N-1}$ denotes a normalized length-N input vector to be quantized such that for N>1, and $\|\alpha\|_2^2 = K$, where K is a known constant. Without losing generality that, the quantization step size in this example is q: $0<q<K$. The example quantization process is then:

Step Q1: Initialize i=0 and L=−1.
Step Q2: Compute $$u_i = \left\lfloor \frac{|\alpha_i| + \Delta}{q} \right\rfloor,$$

where $0<\Delta<q$ is a constant, and $\lfloor \cdot \rfloor$ denotes the floor function. Further compute:

$$s_i = \begin{cases} 0 & \text{if } \alpha_i \geq 0 \\ 1 & \text{if } \alpha_i < 0 \end{cases}, \text{ and } b_i = \begin{cases} 1 & \text{if } u_i > 0 \\ 0 & \text{if } u_i = 0 \end{cases}.$$

If $u_i > 0$ and $q^2 \sum_{j=0}^{i-1} u_j^2 < K$, $L = i$.

Step Q3: Increment i by 1.
Step Q4: Repeat Steps 2-3 until i=N.
Step Q5: If L<0, encode and send an indicator flag signaling that the quantized vector is all 0; otherwise, do the following.
  (a) Encode and send $b_0 \ldots b_{N-1}$ (or equivalent information that allows the decoder to recover $b_0 \ldots b_{N-1}$).
  (b) For i=0 ... L−1,
    (ii) if $b_i$ is equal to 1, encode and send $u_i$ (equivalently $u_i−1$) and $s_i$.
    (iii) Otherwise, skip.
  (c) Encode and send $s_L$.

At the decoder, the encoded normalized vector is reconstructed as $\hat{\alpha} = \hat{\alpha}_0 \ldots \hat{\alpha}_{N-1}$, in part through an inverse quantization process. An example inverse quantization process to complement the above-described quantization process may be described as:

Step IQ1: Decode and determine if the quantized vector is all 0. If the quantized vector is all 0, reconstruct $\hat{\alpha}_i = 0$ for all i=0 ... N−1, and terminate the process; otherwise, continue to Step IQ2 below.
Step IQ2: Decode and determine $b_0 \ldots b_{N-1}$. Let L denote the largest i such that $b_i = 1$.
Step IQ3: For i=0 ... L−1, if $b_i$ is equal to 1, decode and reconstruct $u_i$ and $s_i$; otherwise set $u_i = 0$ and $s_i = 0$. Reconstruct $\hat{\alpha}_i = (1-2s_i)qu_i$.
Step IQ4: Decode and determine $s_L$. Reconstruct
$$\hat{\alpha}_L = (1-2s_L)\sqrt{K-\sum_{i=0}^{L-1}\hat{\alpha}_i^2}.$$

Step IQ5: For i=L+1 ... N−1, reconstruct $\hat{\alpha}_i = 0$.

In some embodiments, the normalized source vector $\alpha$ is $\theta_x = (\theta_{x,1}, \ldots, \theta_{x,N-1})$, where $\cos \theta_{x,i} = \alpha_{x,i}$. To reduce the range of $\theta_{x,i}$, i=1, ..., N−1, the absolute value of $\alpha_{x,i}$ may be used to compute $\cos \theta_i = |\alpha_{x,i}|$, and code the sign of $\alpha_{x,i}$ separately if $|\alpha_{x,i}|>0$. This results in $$0 \leq \theta_i \leq \frac{\pi}{2}$$

and $0 \leq \cos \theta_i \leq 1$.

As noted above, the quantizer may either quantize $|\alpha_{x,i}|$ or $\theta_{x,i}$. Due to the concavity of the cosine function in $$\left[0, \frac{\pi}{2}\right],$$

quantizing $|\alpha_{x,i}|$ by using a uniform quantizer might lead to a coarser angle resolution near 0, and a finer angle resolution near $$\frac{\pi}{2}.$$

Conversely, quantizing $\theta_{x,i}$ by using a uniform quantizer might lead to a coarser quantization of $|\alpha_{x,i}|$ near 0, and finer quantization near 1. With these features in mind, an embodiment may quantize $|\alpha_{x,i}|$ or $\theta_{x,i}$ depending upon application requirements, i.e., if the quantization noise on angles is to be uniformly bounded, then a quantizer designed for $\theta_{x,i}$ is chosen; otherwise if the quantization noise on $\alpha_{x,i}$ is to be uniformly bounded, then a quantizer designed for $|\alpha_{x,i}|$ is used. The encoder may make this determination and, in some embodiments, a flag might be used to indicate which quantizer is used to reconstruct the vector $\hat{\alpha}_x$ (or equivalently $\hat{\theta}_x$).

Having quantized the normalized vector $\alpha_x$, or equivalently, the angle vector $\theta_x$, the encoder then quantizes the radius $r_x$. The quantization of $r_x$ contributes to the part $$\frac{(r_x - r_y)^2}{2r_x^2 + (N-1)C_2}$$

in WMSE or $$\frac{(r_x - r_y)^2}{r_x^2 + r_y^2 + (N-1)C_2}$$

in SSIM. Once the reconstructed normalized vector $\hat{\alpha}_x = \hat{\alpha}_{x,0} \ldots \hat{\alpha}_{x,N-1}$ is available, its information can be used in quantization of the radius $r_x$. For example, the quantization step size used to quantize $r_x$ might depend upon $\hat{\alpha}_x$. In one embodiment, the quantization step size decreases as the number of nonzero values, i.e., $\Sigma_{i=0}^{N-1} b_{x,i}$, in $\hat{\alpha}_x$ increases. Note that $x = r_x \alpha_x$, and its reconstruction $\hat{x} = \hat{r}_x \hat{\alpha}_x$. Thus, at a position i where $b_{x,i}$ is 0, the distortion is $(r_x \alpha_{x,i})^2$ regardless what $\hat{r}_x$ is; while at a position i where $b_i$ is 1, the distortion may be given by:

$$(r_x\alpha_{x,i} - \hat{r}_x\hat{\alpha}_{x,i})^2 = r_x^2(\alpha_{x,i} - \hat{\alpha}_{x,i})^2 + \hat{\alpha}_{x,i}^2(r_x - \hat{r}_x)^2 + 2r_x\hat{\alpha}_{x,i}(\alpha_{x,i} - \hat{\alpha}_{x,i})(r_x - \hat{r}_x).$$

The above quantity decreases as $(r_x - \hat{r}_x)^2$ decreases as long as $|\hat{\alpha}_{x,i}| \gg |\alpha_{x,i} - \hat{\alpha}_{x,i}|$, e.g. in high rate quantization.

In another embodiment, the quantization is applied to $\bar{r}_x = r_x \langle \alpha_x, \hat{\alpha}_x \rangle$ instead of $r_x$, where $\bar{r}_x$ is the length of the projection of x onto the direction of $\hat{\alpha}_{x,i}$. This approach may be justified based on the observation that the sum $\Sigma_{i=0}^{N-1} (r_x\alpha_{x,i} - r\hat{\alpha}_{x,i})^2$ is minimized with:

$$r = r_x \langle \alpha_x, \hat{\alpha}_x \rangle = r_x \sum_{i=0}^{N-1} \alpha_{x,i}\hat{\alpha}_{x,i},$$

since for any r, $$\sum_{i=0}^{N-1} (r_x\alpha_{x,i} - r\hat{\alpha}_{x,i})^2 =$$

$$\sum_{i=0}^{N-1} (r_x\alpha_{x,i} - \bar{r}_x\hat{\alpha}_{x,i} + \bar{r}_x\hat{\alpha}_{x,i} - r\hat{\alpha}_{x,i})^2 = \sum_{i=0}^{N-1} (r_x\alpha_{x,i} - \bar{r}_x\hat{\alpha}_{x,i})^2 +$$

$$2\sum_{i=0}^{N-1} (r_x\alpha_{x,i} - \bar{r}_x\hat{\alpha}_{x,i})(\bar{r}_x\hat{\alpha}_{x,i} - r\hat{\alpha}_{x,i}) + \sum_{i=0}^{N-1} (\bar{r}_x\hat{\alpha}_{x,i} - r\hat{\alpha}_{x,i})^2 =$$

$$\sum_{i=0}^{N-1} (r_x\alpha_{x,i} - \bar{r}_x\hat{\alpha}_{x,i})^2 + 2(\bar{r}_x - r)\sum_{i=0}^{N-1} (r_x\alpha_{x,i}\hat{\alpha}_{x,i} - \bar{r}_x\hat{\alpha}_{x,i}^2) +$$

$$\sum_{i=0}^{N-1} (\bar{r}_x\hat{\alpha}_{x,i} - r\hat{\alpha}_{x,i})^2 = \sum_{i=0}^{N-1} (r_x\alpha_{x,i} - \bar{r}_x\hat{\alpha}_{x,i})^2 +$$

$$2(\bar{r}_x - r)\left(\bar{r}_x - \bar{r}_x\sum_{i=0}^{N-1} \hat{\alpha}_{x,i}^2\right) + \sum_{i=0}^{N-1} (\bar{r}_x\hat{\alpha}_{x,i} - r\hat{\alpha}_{x,i})^2 =$$

$$\sum_{i=0}^{N-1} (r_x\alpha_{x,i} - \bar{r}_x\hat{\alpha}_{x,i})^2 + \sum_{i=0}^{N-1} (\bar{r}_x\hat{\alpha}_{x,i} - r\hat{\alpha}_{x,i})^2 \geq \sum_{i=0}^{N-1} (r_x\alpha_{x,i} - \bar{r}_x\hat{\alpha}_{x,i})^2$$

The decoder does not know $r_x^2$ due to information loss in quantization. To account for the impact of $r_x^2$ in the denominator, one example solution is to code a quantization parameter to indicate to the decoder the chosen quantization step size for a set of image blocks. On the encoder side, the quantization parameter may then be selected according to all $r_x^2$ in the set of image blocks. The effective quantization step size to reconstruct $\hat{r}_x$ at the decoder for a particular image block x in the set may then be further modified according to the reconstructed $\hat{\alpha}_x$ as described above.

Finally, let (f, g) be a function pair such that for any $a \geq 0$, g(f(a)) = a. In other words, g is the inverse function of f. In some embodiments, instead of quantizing $r_x$ directly, the quantizer quantizes $f(r_x)$ by using the quantization step size derived above. For brevity, let $u_x$ denote $f(r_x)$ and $\hat{u}_x$ denote the reconstruction of $f(r_x)$. Then the reconstruction of $r_x$ is given by $\hat{r}_x = g(\hat{u}_x)$.

If, for example, $f(a) = \sqrt{a}$ and $g(b) = b^2$, then $\hat{r}_x = g(\hat{u}_x) = \hat{u}_x^2$.

In another example, if $f(a) = \ln a$ and $g(b) = e^b$, where ln denotes the natural logarithm function, and e denotes the base of the natural logarithm function, then $\hat{r}_x = g(\hat{u}_x) = e^{\hat{u}_x}$.

Quantization with Prediction—Differential Coding

Due to the proposed order of quantization described above, the quantizer has an opportunity to use prediction information efficiently. In the following description, $p = p_0 \ldots p_{N-1}$ denotes the prediction of x, $\alpha_p = \alpha_{p,0} \ldots \alpha_{p,N-1}$ denotes the normalized prediction vector, $$\text{i.e., } \alpha_{p,i} = \frac{p_i}{\|p\|_2},$$

and $\theta_p = \theta_{p,0} \ldots \theta_{p,N-1}$ denotes the angle vector of p, i.e., $\theta_{p,i} = \cos^{-1}\alpha_{p,i}$.

In one example embodiment, the quantization and encoding of image block x may rely upon prediction p where $\|p\|_2 > \epsilon$, where $\epsilon \geq 0$ is a constant. The encoding process involves quantizing and coding the normalized residual vector $\alpha_e = \alpha_x - \alpha_p$. $\hat{\alpha}_e$ denotes the reconstruction of $\alpha_e$, and $\hat{\alpha}_x$ denotes $\alpha_p + \hat{\alpha}_e$. The quantization is subject the following constraint:

$$\sum_{i=0}^{N-1} (\alpha_{e,i} + \alpha_{p,i})^2 = 1$$

After quantizing and coding the normalized residual vector, then the residual radius $r_e$ (vector magnitude) is quantized and coded, where $$r_e = r_x - r_p \frac{\langle p, \hat{\alpha}_x \rangle}{\|p\|_2}.$$

Note that $r_p = \|p\|_2$. The reconstruction is denoted $\hat{r}_e$, and $\hat{r}_x$ denotes $$\hat{r}_e + r_p \frac{\langle p, \hat{\alpha}_x \rangle}{\|p\|_2}.$$

At a decoder, the image block x is reconstructed as $\hat{x}$, by determining $\hat{r}_x \hat{\alpha}_x$. First, the decoder decodes and reconstructs $\hat{\alpha}_e$ and subsequently $\hat{\alpha}_x$, which results from $\alpha_p + \hat{\alpha}_e$. It then decodes and reconstructs $\hat{r}_e$, and subsequently $$\hat{r}_x = \hat{r}_e + r_p \frac{\langle p, \hat{\alpha}_x \rangle}{\|p\|_2}.$$

At the encoder, the quantization of the normalized residual vector $\alpha_e$, under the L2 constraint on $\Sigma_{i=0}^{N-1}(\alpha_{e,i} + \alpha_{p,i})^2$, may be implemented, in one example, using the following process:

Step E1: Initialize i=0 and L=−1.
Step E2: Compute $$u_{e,i} = \left\lfloor \frac{|\alpha_{e,i}| + \Delta}{q} \right\rfloor,$$

where $0<\Delta<q$ is a constant. Further compute:

$$s_{e,i} = \begin{cases} 0 & \text{if } \alpha_{e,i} \geq 0 \\ 1 & \text{if } \alpha_{e,i} < 0 \end{cases}, \text{ and}$$

$$b_{e,i} = \begin{cases} 1 & \text{if } u_{e,i} > 0 \\ 0 & \text{if } u_{e,i} = 0 \end{cases}.$$

If $u_{e,i} > 0$ and $\sum_{j=0}^{i-1}(qu_{e,j} + \alpha_{p,j})^2 < 1$, $L = i$.

Step E3: Increment i by 1.
Step E4: Repeat Steps E2-E3 until i=N.
Step E5: If L<0, encode and send an indicator flag signalling that the quantized vector is all 0; otherwise, do the following:
  (a) Encode and send $b_{e,0} \ldots b_{e,N-1}$ (or equivalent information that allows the decoder to recover $b_{e,0} \ldots b_{e,N-1}$).
  (b) For i=0 ... L−1,
    (i) if $b_{e,i}$ is equal to 1, encode and send $u_{e,i}$ (equivalently $u_{e,i}$−1) and $s_{e,i}$.
    (ii) Otherwise, skip.
  (c) Encode and send $s_{e,L}$.

In further illustration of this example, at the decoder a corresponding decoding and inverse quantization process may be implemented to reconstruct $\hat{\alpha}_x$. For convenience, sign flags for the prediction vector are defined as:

$$s_{p,i} = \begin{cases} 0 & \text{if } \alpha_{p,i} \geq 0 \\ 1 & \text{if } \alpha_{p,i} < 0 \end{cases}$$

The decoding process, in this example, may then be described as:
Step D1: Decode and determine if the quantized residual vector is all 0. If the quantized residual vector is all 0, reconstruct $\hat{\alpha}_{e,i}=0$ for all i=0 ... N−1, $\hat{\alpha}_x=\alpha_p$, and terminate the process; otherwise, continue to Step D2 below.
Step D2: Decode and determine $b_{e,0} \ldots b_{e,N-1}$. Let L denote the largest i such that $b_{e,i}=1$.
Step D3: For i=0 ... L−1, if $b_{e,i}$ is equal to 1, decode and determine $u_{e,i}$ and $s_{e,i}$; otherwise set $u_{e,i}=0$ and $s_{e,i}=0$. Reconstruct $\hat{\alpha}_{e,i}=(1-2s_{e,i})qu_{e,i}$, and $\hat{\alpha}_{x,i}=\hat{\alpha}_{e,i}+\alpha_{p,i}$.
Step D4: Decode and determine $s_{e,L}$. Reconstruct:

$\hat{\alpha}_{e,L}=(1-2s_{e,L})|$
$\sqrt{1-\sum_{i=0}^{L-1}(\hat{\alpha}_{e,i}+\alpha_{p,i})^2-\sum_{i=L+1}^{N-1}(\alpha_{p,i})^2}-\alpha_{p,L}(1-2(s_{e,L}\oplus s_{p,L}))|$,
where $\oplus$ denotes the binary XOR operator, i.e. $s_{e,L}\oplus s_p$,
L=

$$\begin{cases} 0 & \text{if } s_{e,L} = s_{p,L} \\ 1 & \text{otherwise} \end{cases}, \text{ and } \hat{\alpha}_{x,L} = \hat{\alpha}_{e,L} + \alpha_{p,L}.$$

Step D5: For i=L+1 ... N−1, reconstruct $\hat{\alpha}_{e,i}=0$, and $\hat{\alpha}_{x,i}=\alpha_{p,i}$.

Although $\alpha_e$ is calculated and quantized in the above example, the same processes may be applied to $\theta_e=\theta_x-\theta_p$. Let $\hat{\theta}_e$ denote the reconstruction of $\theta_e$, and $\hat{\theta}_x$ denote $\theta_p+\hat{\theta}_e$. Then $\hat{\alpha}_x$ may be reconstructed as $\hat{\alpha}_{x,i}=\cos\hat{\theta}_{x,i}$ for i=0 ... N−1, and the constraint $\Sigma_{i=0}^{N-1}(\alpha_{e,i}+\alpha_{p,i})^2=1$ becomes $\Sigma_{i=0}^{N-1}(\cos(\theta_{e,i}+\theta_{p,i}))^2=1$.

In the above examples, $$r_e = r_x - r_p \frac{\langle p, \hat{\alpha}_x \rangle}{\|p\|_2}$$

is quantized instead of $r_x$. However, it will be appreciated that $$r_p \frac{\langle p, \hat{\alpha}_x \rangle}{\|p\|_2}$$

can be regarded as the norm of the vector projection of p onto the direction of $\hat{\alpha}_x$. In light of this, in some embodiments the encoder may quantize $r_e=\|x-p\|_2$. In a further embodiment, the encoder may quantize $r_e=\|x-r_x\langle\hat{\alpha}_x,\alpha_p\rangle\alpha_p\|_2=r_x\sin\omega$. Note that $r_x\langle\hat{\alpha}_x,\alpha_p\rangle\alpha_p$ can be regarded as the rejection of x from the prediction p, and ω denotes the angle between $\hat{\alpha}_x$ and $\alpha_p$, i.e., $\cos\omega=\langle\hat{\alpha}_x,\alpha_p\rangle$. In yet another embodiment, the encoder may quantize $r_x\langle\hat{\alpha}_x,\alpha_p\rangle=r_x\cos\omega$ if cos ω is larger than a nonzero constant threshold. Since $(r_x\sin\omega)^2$ or $(r_x\cos\omega)^2$ is no greater than $r_x^2$, it may be generally advantageous to quantize $r_x\sin\omega$ or $r_x\cos\omega$ instead of $r_x$ itself.

Where there is no prediction, the quantization step size used in quantizing $r_x$ (or equivalently reconstructing $\hat{r}_x$) might be dependent upon $\hat{\alpha}_x$. Similarly, in the case where prediction is available, the quantization step size used in reconstructing $\hat{r}_x$ above might be dependent upon $\hat{\alpha}_x$ as a combination of $\hat{\alpha}_e$ and $\alpha_p$. For example, the quantization step size might depend on the cardinality of the set $\{\hat{\alpha}_{x,i}: |\hat{\alpha}_{x,i}|\leq\epsilon\}$, where ϵ is a small non-negative constant, that is, when everything else being equal, the quantization step size might be larger as $|\{\hat{\alpha}_{x,i}:|\hat{\alpha}_{x,i}|\leq\epsilon\}|$ gets larger, and might be smaller as $|\{\hat{\alpha}_{x,i}:|\hat{\alpha}_{x,i}|\leq\epsilon\}|$ gets smaller.

Finally, in some embodiments, the reconstruction of $\hat{\alpha}_x$ and $\hat{r}_x$ may use two distinct prediction information, respectively. For example, $\hat{\alpha}_x$ may be reconstructed by using prediction vector p or without using any prediction, and $\hat{r}_x$ may be reconstructed by using a magnitude reconstructor determined by using information in $\hat{\alpha}_x$, e.g., using a scalar predictor v that might not be directly related to p. In one example, suppose there is a set of candidate prediction vectors V such that p∈V, and V contains at least one member different from p, i.e., |V|≥2. Once $\hat{\alpha}_x$ is reconstructed, the magnitude reconstructor used to reconstruct $\hat{r}_x$ might be determined by using a predictor v determined from the vector q* in V such that q* is the closest match to $\hat{\alpha}_x$, for example:

$$q^* = \underset{q \in V}{\text{argmin}} \|\alpha_q - \hat{\alpha}_x\|_2$$

where $$\alpha_q = \frac{q}{\|q\|_2}$$

is the normalized vector derived from q. Alternatively q* may be determined as follows:

$$q^* = \text{argmax}_{q \in V} \langle \alpha_q, \hat{\alpha}_x \rangle.$$

Quantization with Prediction—Rotation

As an alternative to differential coding, and based on the use of polar coordinates, some embodiments may use rotation to take advantage of the prediction information. An example of such a rotation-based encoding process is as follows:
1. Rotate p and x to p' and x', respectively, so that p' is aligned to a fixed axis e*.
2. Compute and quantize the angle ω between p and x, i.e., cos ω=⟨$\alpha_p$, $\alpha_x$⟩. Alternatively, in some embodiments cos ω is quantized and encoded instead. In either case, let $\hat{\omega}$ denote the reconstructed angle (in the latter case cos $\hat{\omega}$ is equal to the reconstructed value of cos ω).
3. Quantize $\alpha_{x'}$, excluding the component on the axis aligned with p' which is equal to cos ω, subject to the following constraint:

$$\sum_{i=0}^{N-1} (\alpha_{x',i})^2 = 1.$$

$\hat{\alpha}_{x'}$ denotes the reconstructed normalized vector.
4. Depending upon $\hat{\omega}$, quantize and code $r_\omega = |r_x \cos \hat{\omega}|$ or $r_\omega = |r_x \sqrt{1-\cos^2\hat{\omega}}|$. For example, choose the former when $\sqrt{1-\cos^2\hat{\omega}}$ is close to 0 and the latter when $|\cos \hat{\omega}|$ is close to 0 for computational stability in inverse quantization When neither $|\cos \hat{\omega}|$ nor $\sqrt{1-\cos^2\hat{\omega}}$ is close to 0, one might choose the smaller value between the two. Whatever mechanism is used to determine the choice, that choice is known to the decoder. Let $\hat{r}_\omega$ denote its reconstruction from which $\hat{r}_x$ can be reconstructed.

At the decoder, a corresponding inverse quantization operation may be illustrated by this example process:
1. Decode and reconstruct $\hat{\omega}$ and $\hat{\alpha}_{x'}$, similar in manner to the process described above in connection with the non-prediction-based example.
2. Decode and reconstruct $\hat{r}_\omega$, and subsequently $\hat{r}_x$. Note that the reconstruction of $\hat{r}_x$ from $\hat{r}_\omega$ might depend upon $\hat{\omega}$ For example, $$\hat{r}_x = \frac{\hat{r}_\omega}{\cos\hat{\omega}}$$

when $\sqrt{1-\cos^2\hat{\omega}}$ is close to 0 or $|\cos \hat{\omega}| < \sqrt{1-\cos^2\hat{\omega}}$, or $$\hat{r}_x = \frac{\hat{r}_\omega}{\sqrt{1-\cos^2\hat{\omega}}}$$

when $|\cos \hat{\omega}|$ is close to 0 or $|\cos \hat{\omega}| \geq \sqrt{1-\cos^2\hat{\omega}}$.

3. Rotate $\hat{\alpha}_{x'}$ so that the axis e* is aligned to p to obtain $\hat{\alpha}_x$.
4. Reconstruct the source vector as $\hat{r}_x \hat{\alpha}_x$.

As with the differential coding example, the processes described above may be extended to the case where the reconstruction of $\hat{\alpha}_x$ and the reconstruction of $\hat{r}_x$ may use two distinct prediction information, respectively.

Figure 3:
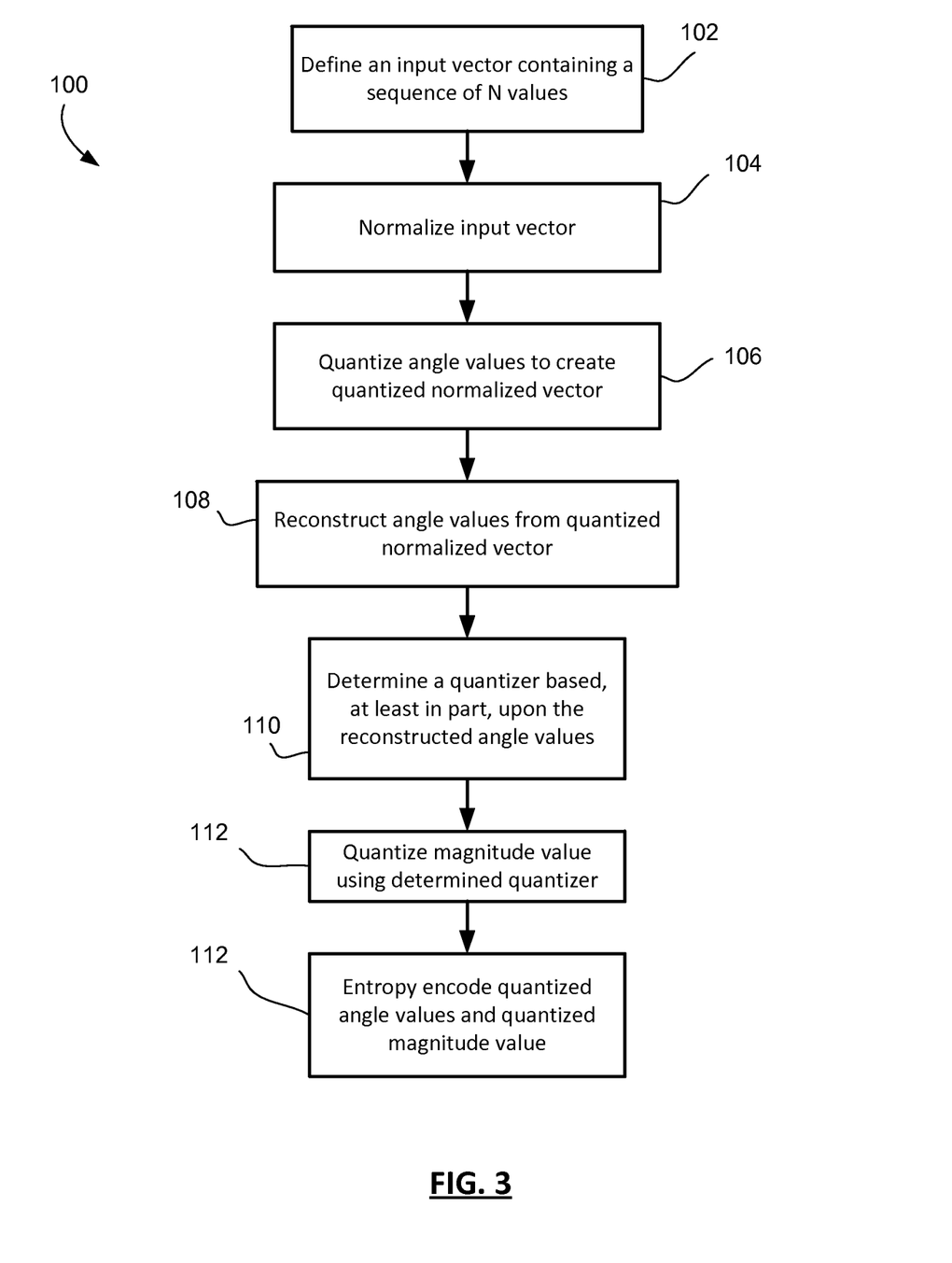
FIG. 3 shows, in flowchart form, one example process for encoding an image or video.

Reference is now made to FIG. 3, which shows, in flowchart form, one example process 100 for encoding video data. In the example process 100, a sequence is defined as an input vector in operation 102. The sequence may be a series of N values, such as a set of pixel values or a set of transform domain coefficients from spectrally transformed pixel values, ordered in accordance with a scan order. The input vector is thus an N-dimensional vector.

In operation 104, the L2 norm (i.e. magnitude) of the input vector is computed, and a normalized vector is obtained by dividing the input vector by the L2 norm (i.e. magnitude) of the input vector. The resulting normalized vector, which may sometimes be referred as the angle values, are then quantized to create a quantized normalized vector in operation 106. The quantization of the normalized vector may be carried out using a number of possible quantization schemes, including a uniform quantizer, a lattice structure, etc. The quantization process may be carried out under the constraint that the L2 norm of the normalized vector is 1. In another embodiment where fixed point arithmetic is used, the constraint is that the L2 norm of the normalized vector is K, where K corresponds to the fixed-point representation of 1. In yet another embodiment the magnitude value might be the L1 norm or other norm of the input vector, e.g. For a real number p≥1, the p-norm or Lp-norm of x is defined by $$\|x\|_p = (|x_1|^p + |x_2|^p + \ldots + |x_n|^p)^{\frac{1}{p}}.$$

In operation 108, the angle values are reconstructed from the quantized normalized vector. This operation may occur in the feedback loop for reconstruction of an image or portion of an image for use in further prediction operations with respect to other blocks of data. The lossy reconstruction operation produces reconstructed angle values (or, equivalently for the purposes of this process 100, reconstructed normalized vector).

In operation 110, the encoder selects a quantizer for quantizing the magnitude value of the input vector. The quantizer is selected, as least in part, based upon the reconstructed angle values (or, equivalently, the reconstructed normalized vector). As described above, the quantizer design for quantizing the magnitude value is influenced by the reconstructed angle values. In one embodiment, the quantizer may have a quantization step size that varied based upon the reconstructed angle values. For example, the step size may be based upon the number of non-zero reconstructed angle values.

Having determined the quantizer, then encoder then quantizes the magnitude value in operation 112. As noted above, the magnitude value may be the magnitude of the input vector in some embodiments. In some embodiments, the magnitude value is obtained by applying a function to the magnitude of the input vector and then quantizing the result, with the understanding that the decoder will inverse quantize and then apply the inverse function in order to create a reconstructed magnitude.

In operation 114, the encoder entropy encodes the quantized angle value and the quantized magnitude value. The process 100 may be repeated on a block-by-block basis for an image, picture, frame, etc. The selection of the quantizer used for the angle values may be made on a picture, frame, group-of-pictures, slice, coding unit, or transform units basis, in some embodiments.

Figure 4:
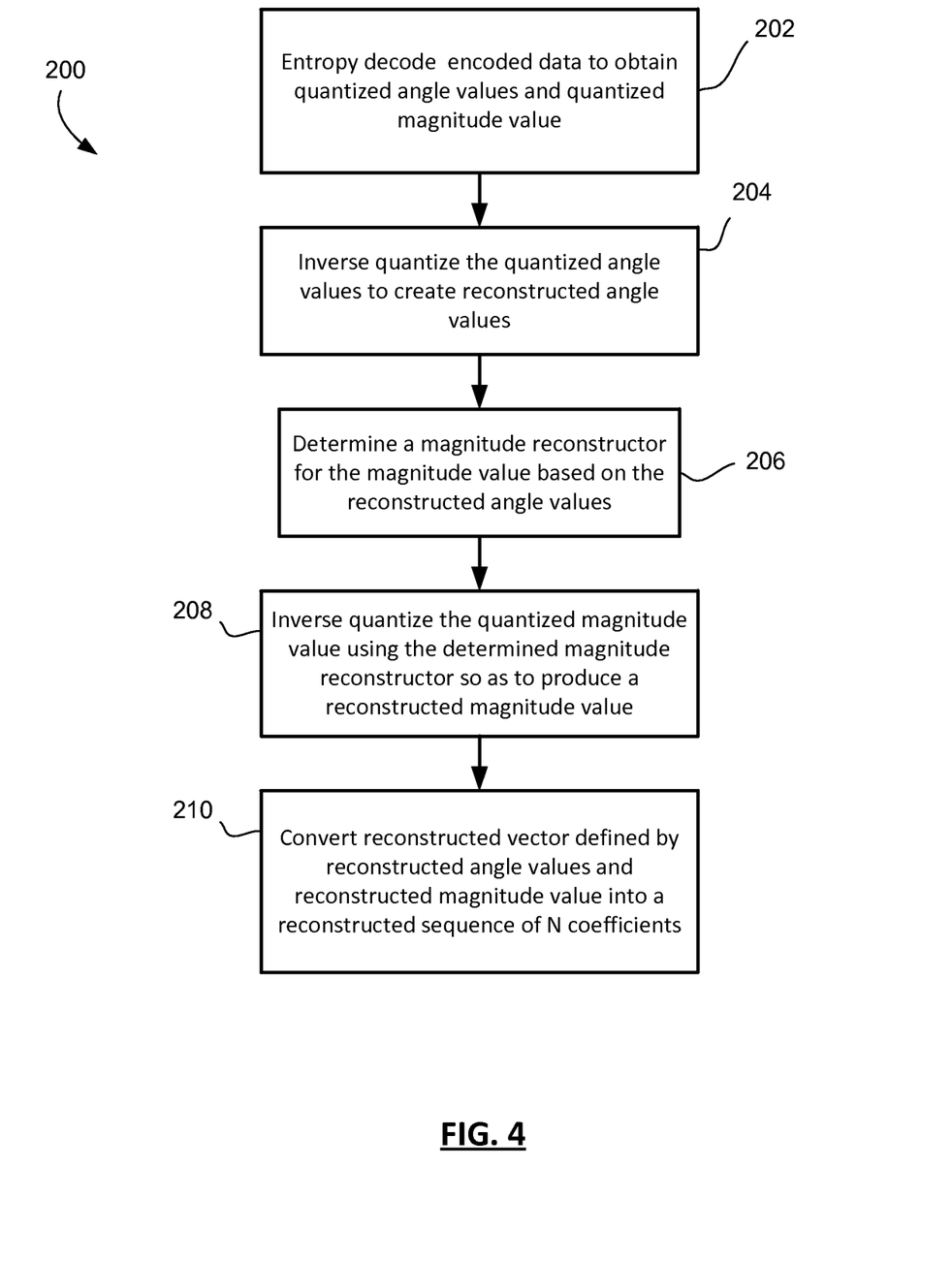
FIG. 4 shows, in flowchart form, one example process for decoding an image or video.

Reference is now made to FIG. 4, which shows, in flowchart form, one example process 200 for decoding encoded data to reconstruct an image. The process 200 may be implemented by a decoder.

In operation 202, the decoder receives and entropy decodes the encoded data to obtain quantized angle values and the quantized magnitude value for a block of data. The block may correspond to a coding unit, transform unit, or other block of the image or video data.

In operation 204, the decode inverse quantizes the quantized angle values to produce reconstructed angle values. The inverse quantization corresponds to the quantization applied by the encoder. The specific quantizer may be set by default or may be signaled to the decoder in the header information for the image or view. For example, it may be signaled in the sequence set header, picture or frame header, or elsewhere in the bitstream.

Having created the reconstructed angle values (or reconstructed normalized vector, as noted above), in operation 206 the decoder then determines the magnitude reconstructor for inverse quantization of the quantized magnitude value. This determination corresponds to the determination of a quantizer made by the encoder, and is based, at least in part, on the reconstructed angle values.

The decoder then inverse quantizes the quantized magnitude value to create a reconstructed magnitude value, as indicated by operation 208. The inverse quantization uses the magnitude reconstructor defined in operation 206.

Having reconstructed the angle values and the magnitude value, i.e. reconstructed the input vector, the decoder then converts the vector defined by the reconstructed angle values and reconstructed magnitude value to a sequence of N coefficients, thereby producing a reconstructed sequence of N coefficients. In the example case where the sequence is a sequence of transform domain coefficients, the conversion results in creating the block of reconstructed transform domain coefficients, which may then be used in reconstructing the image and/or video.

Figure 5:
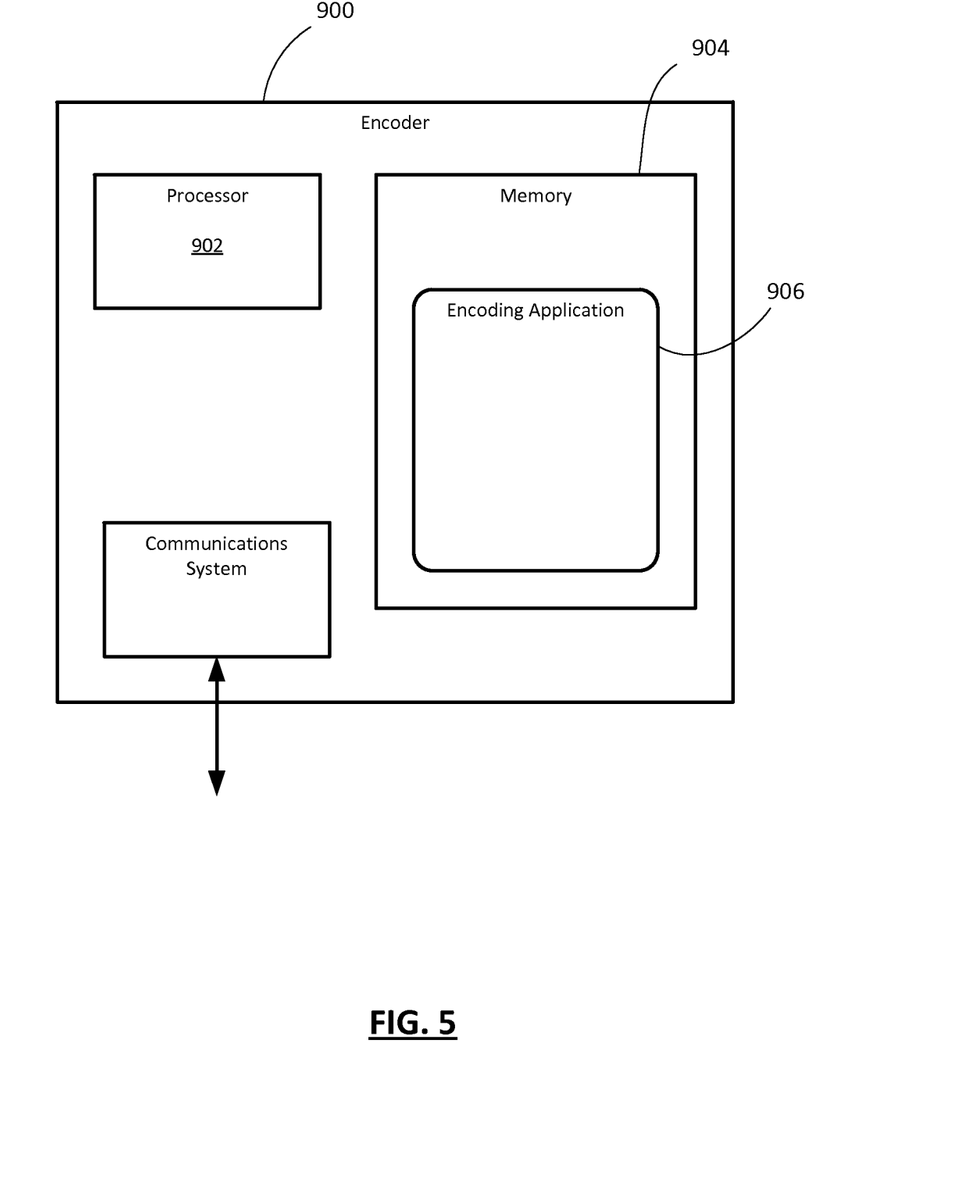
FIG. 5 shows a simplified block diagram of an example embodiment of an encoder.

Reference is now made to FIG. 5, which shows a simplified block diagram of an example embodiment of an encoder 900. The encoder 900 includes a processor 902, memory 904, and an encoding application 906. The encoding application 906 may include a computer program or application stored in memory 904 and containing instructions that, when executed, cause the processor 902 to perform operations such as those described herein. For example, the encoding application 906 may encode and output bitstreams encoded in accordance with the processes described herein. It will be understood that the encoding application 906 may be stored in on a non-transitory computer-readable medium, such as a compact disc, flash memory device, random access memory, hard drive, etc. When the instructions are executed, the result in configuring the 902 processor so as to create a special-purpose processor that implements the described process(es). Such a processor may be referred to as a "processor circuit" or "processor circuitry" in some examples.

Figure 6:
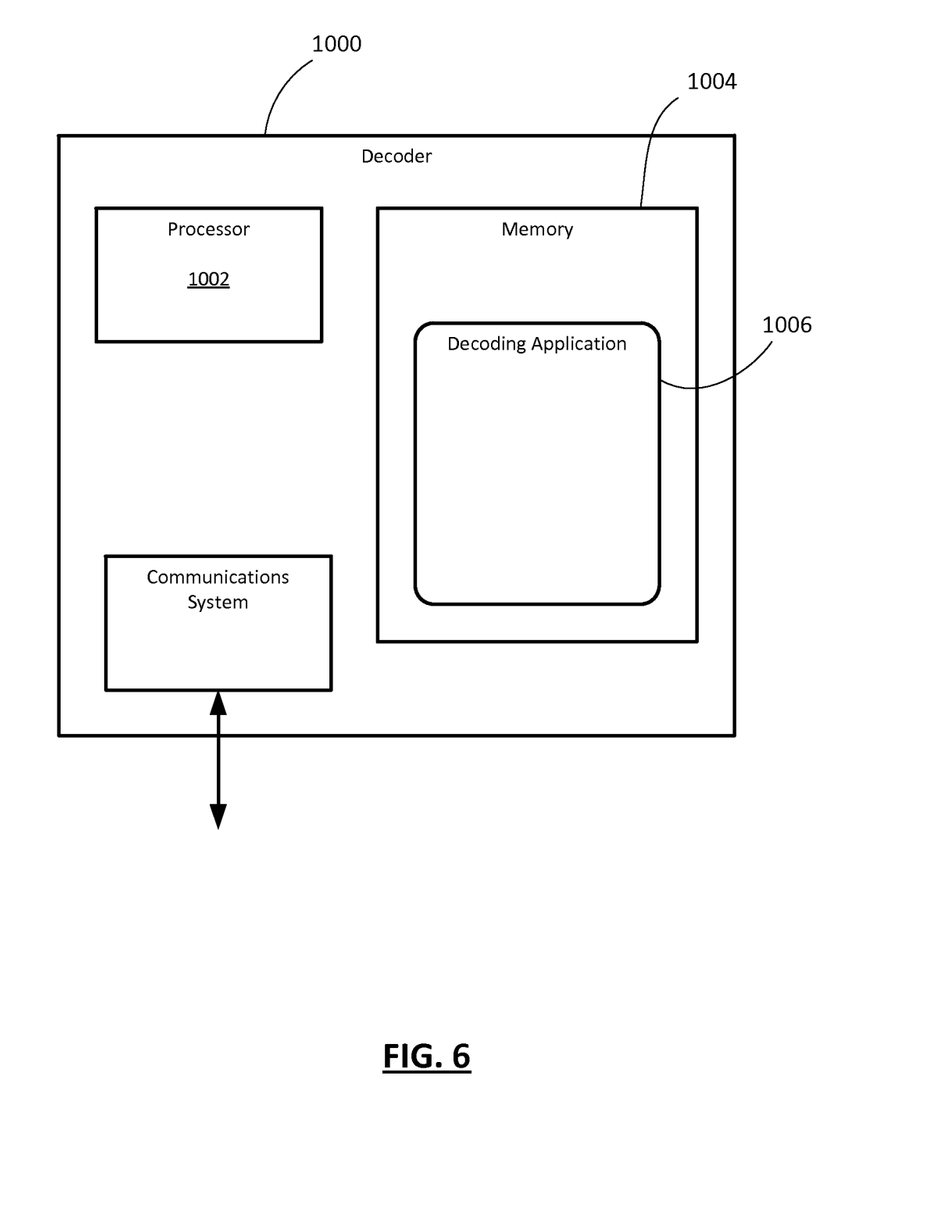
FIG. 6 shows a simplified block diagram of an example embodiment of a decoder.

Reference is now also made to FIG. 6, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions that, when executed, cause the processor 1002 to perform operations such as those described herein. It will be understood that the decoding application 1006 may be stored in on a computer-readable medium, such as a compact disc, flash memory device, random access memory, hard drive, etc. When the instructions are executed, the result in configuring the 1002 processor so as to create a special-purpose processor that implements the described process (es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of encoding an image to create a bitstream of encoded data using an encoder, the image being partitioned into blocks, wherein a current block contains a sequence of N coefficients, and wherein the sequence is an input vector of N dimensions, the input vector having a magnitude value, the method comprising:
normalizing the input vector using the magnitude value of the input vector to generate a normalized vector, the normalized vector having angle values;
quantizing the normalized vector to produce a quantized normalized vector;
reconstructing the angle values from the quantized normalized vector;
determining a quantizer based on the reconstructed angle values;
quantizing the magnitude value using the quantizer; and
entropy encoding the quantized normalized vector and the quantized magnitude value to produce the encoded data.

2. The method claimed in claim 1, wherein the sequence of N coefficients comprises a sequence of N transform coefficients.

3. The method claimed in claim 2, wherein the current block comprises a 4×4 block and wherein N=16.

4. The method claimed in claim 2, wherein the current block comprises AC coefficients of a 4×4 block and wherein N=15.

5. The method claimed in claim 1, wherein each of the reconstructed angle values comprises an angle whose cosine defines an element in a reconstructed normalized vector.

6. The method claimed in claim 1, wherein determining includes selecting a prediction vector based on the number of reconstructed angle values.

7. The method claimed in claim 1, wherein quantizing the magnitude value comprises applying a function to the magnitude of the input vector to generate the magnitude value and quantizing the magnitude value.

8. The method claimed in claim 7, wherein the function comprises one of square root, square, logarithm, or natural logarithm.

9. The method claimed in claim 1, wherein the angle values are error values between angles of the input vector and angles of a predicted vector.

10. The method claimed in claim 1, wherein the magnitude value comprises a magnitude error comprising the difference between the magnitude of the input vector and the magnitude of a projected prediction vector.

11. The method claimed in claim 10, wherein the magnitude of the projected prediction vector comprises the norm of prediction vector projected onto the input vector.

12. The method claimed in claim 1, further comprising refining a prediction based upon the reconstructed angle values, and wherein determining the quantizer is at least partly based upon the refined prediction.

13. An encoder for encoding an image from a bitstream of encoded data, the image being partitioned into blocks, wherein a current block contains a sequence of N coefficients, and wherein the sequence is an input vector of N dimensions, the input vector having a magnitude value, the encoder comprising:
a processor;
a memory; and
an encoding application stored in memory and containing instructions executable by the processor to
normalize the input vector using the magnitude value of the input vector to generate a normalized vector, the normalized vector having angle values;
quantize the normalized vector to produce a quantized normalized vector;
reconstruct the angle values from the quantized normalized vector;
determine a quantizer based on the reconstructed angle values;
quantize the magnitude value using the quantizer; and
entropy encode the quantized normalized vector and the quantized magnitude.

14. A method of decoding a bitstream of encoded data using a decoder to create a reconstructed image corresponding to an image, the image being partitioned into blocks, wherein a current block contains a sequence of N coefficients, and wherein the sequence is an input vector of N dimensions, the input vector having a magnitude value, the method comprising:
decoding the encoded data to obtain a quantized normalized vector and a quantized magnitude value;
inverse quantizing the quantized normalized vector to obtain reconstructed angle values;
determining a magnitude reconstructor based on the reconstructed angle values; and
generating a reconstructed magnitude value from the quantized magnitude value using the magnitude reconstructor,
wherein a reconstructed vector defined by the reconstructed angle values and the reconstructed magnitude value comprises a reconstructed sequence of the N coefficients.

15. The method claimed in claim 14, wherein determining includes selecting the magnitude reconstructor based on the number of non-zero reconstructed angle values.

16. The method claimed in claim 14, wherein the magnitude value comprises the magnitude of the input vector after application of a function and wherein generating the reconstructed magnitude further includes applying an inverse function to obtain a reconstructed magnitude of the input vector from the reconstructed magnitude function.

17. The method claimed in claim 16, wherein the function comprises one of square root, square, logarithm, or natural logarithm.

18. The method claimed in claim 14, wherein the angle values are error values between angles of the input vector and angles of a predicted vector.

19. The method claimed in claim 14, wherein the magnitude value comprises a magnitude error comprising the difference between the magnitude of the input vector and the magnitude of a projected prediction vector.

20. The method claimed in claim 19, wherein the magnitude of the projected prediction vector comprises the norm of prediction vector projected onto the input vector.

21. The method claimed in claim 14, further comprising refining a prediction based upon the reconstructed angle values, and wherein determining the magnitude reconstructor is at least partly based upon the refined prediction.

22. A decoder for decoding a bitstream of encoded data using a decoder to create a reconstructed image corresponding to an image, the image being partitioned into blocks, wherein a current block contains a sequence of N coefficients, and wherein the sequence is an input vector of N dimensions, the input vector having a magnitude value, the decoder comprising:
a processor;
a memory; and
a decoding application stored in memory and containing instructions executable by the processor to
decode the encoded data to obtain a quantized normalized vector and a quantized magnitude value;
inverse quantize the quantized normalized vector to obtain reconstructed angle values;
determine a magnitude reconstructor based on the reconstructed angle values; and
generate a reconstructed magnitude value from the quantized magnitude value by using the magnitude reconstructor,
wherein a reconstructed vector defined by the reconstructed angle values and the reconstructed magnitude value comprises a reconstructed sequence of the N coefficients.

23. A non-transitory processor-readable medium storing processor-executable instructions for decoding a bitstream of encoded data using a decoder to create a reconstructed image corresponding to an image, the image being partitioned into blocks, wherein a current block contains a sequence of N coefficients, and wherein the sequence is an input vector of N dimensions, the input vector having a magnitude value, wherein the processor-executable instructions comprise:

instructions to decode the encoded data to obtain a quantized normalized vector and a quantized magnitude value;
instructions to inverse quantize the quantized normalized vector to obtain reconstructed angle values;
instructions to determine a magnitude reconstructor based on the reconstructed angle values; and
instructions to generate a reconstructed magnitude value from the quantized magnitude value using the magnitude reconstructor,
wherein a reconstructed vector defined by the reconstructed angle values and the reconstructed magnitude value comprises a reconstructed sequence of the N coefficients.

\* \* \* \* \*